May 22, 1962 — D. I. JACOBSON — 3,035,606
VALVE FOR POULTRY WATERER
Filed July 31, 1959
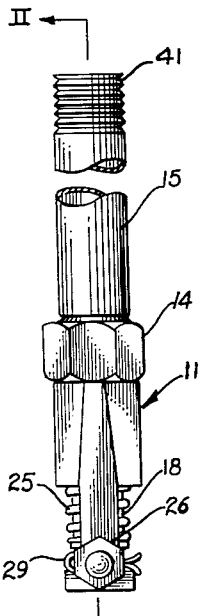
Fig. 1
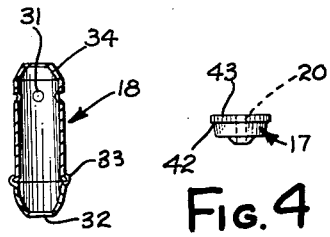
Fig. 5  Fig. 4
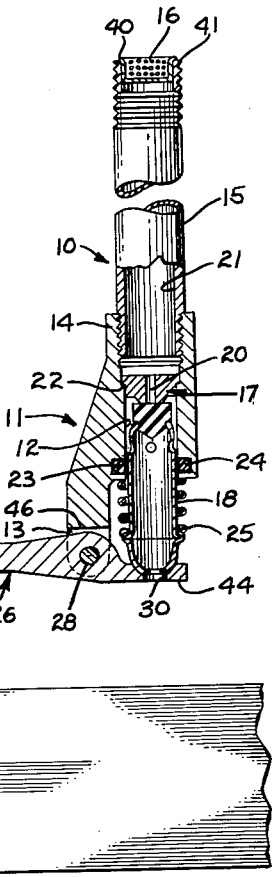
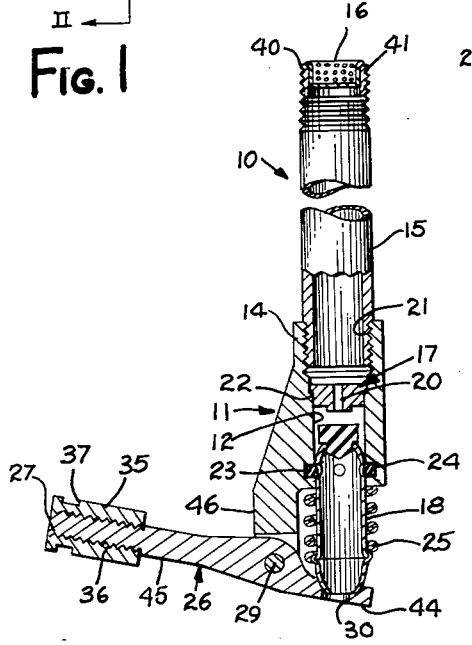
Fig. 3
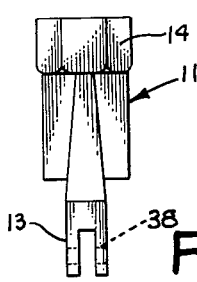
Fig. 2
Fig. 6
INVENTOR
DAVID I. JACOBSON
BY Price and Heneveld
ATTORNEYS United States Patent Office 3,035,606
Patented May 22, 1962

3,035,606
VALVE FOR POULTRY WATERER
David I. Jacobson, Grand Haven, Mich., assignor to Grand Haven Brass Foundry, Grand Haven, Mich., a partnership
Filed July 31, 1959, Ser. No. 830,843
5 Claims. (Cl. 137—408)

This invention pertains to a valve for a poultry waterer, and more particularly to an automatic valve which maintains the water in a trough at a constant level.

It is important that poultry have water at all times. This invention discloses a valve means which assures that the poultry has water, and that the water is maintained at a constant level. Such an arrangement prevents the poultry from spilling the water around their habitat, since the water can be maintained at a level where it is difficult to spill the water from the trough. On the other hand, the valve means provides sufficient water within the trough so that it is an easy matter for the poultry to drink.

Therefore, it is an object of this invention to disclose a valve means which will maintain water in a trough at a constant level.

Another object of this invention is to disclose a valve means whereby the valve can be serviced without removing the valve body from its frame attached position.

It is a further object of this invention to disclose a valve means whereby the valve is controlled by the rate of load build up on a spring.

Still another object of this invention is to disclose a valve body consisting of a minimum number of parts, therefore, economical to manufacture.

Another object of this invention is to disclose a valve means which is adjustable to provide for different levels of water within the trough, and for different weights of troughs.

Still another object of this invention is to disclose a valve which shuts off automatically should the watering trough be accidentally or deliberately removed from the valve.

A further object of this invention is to disclose a valve means that is operative automatically when an empty water trough is attached thereto.

Another object of this invention is to disclose a valve means which is of rugged construction, and thereby requires little maintenance and assures long life.

These and other objects and advantages in the practice of this invention will be more apparent in the illustration and description of a working embodiment of the invention as hereinafter set forth.

In the drawings:

FIG. 1 is a front elevational view of the valve mechanism.

FIG. 2 is a cross sectional view taken along the plane II—II of FIG. 1 showing the valve in the closed position, and as assembled to a water trough.

FIG. 3 is a cross sectional view similar to FIG. 2, however, showing the valve in the open position with the trough removed.

FIG. 4 is a side elevational view of the valve seat.

FIG. 5 is a cutaway side elevational view of the valve spindle.

FIG. 6 is an elevational view of the valve body.

Referring more specifically to the drawings, the valve assembly is designated generally as 10. This assembly includes the valve body 11, nipple 15, valve seat 17, valve spindle 18, spring 25 and lever 26. The valve body 11 is elongated and has a tubular portion with a passage 12 formed therein, and extending therethrough. Attached to the tubular portion is a clevis-like arm 13 extending outwardly and downwardly therefrom and supporting the lever 26. The upper portion of the valve body is a hexagonal nut 14 and adapted to receive a wrench for turning the valve body.

The upper portion of the valve body passage 12 is threaded to receive a nipple 15. The nipple 15 is a tubular member having a bore 21 through which liquid may enter the valve body. The upper portion of the nipple is threaded to receive a connection from a liquid supply line (not shown).

Positioned within the bore 21 of the nipple is a cup-shaped screen 16. The screen 16 has a flange or lip 40 which abuts the end 41 of the nipple 15 and is positioned thereby.

Adjacent and below the bottom threads of the valve body passage 12 is a shoulder 22 which supports a valve seat 17.

Just above the bottom 39 of the valve body is a groove 23 formed in the valve body passage 12. The groove 23 is formed in the valve passage 12 to provide a retainer for an O-ring seal 24. The purpose of the seal will be more fully described hereinafter.

The valve body 11 is constructed from brass, which is rugged and affords a material which is resistive to the corrosive effects of many liquids, and particularly water.

The valve seat 17 is best shown in FIG. 4. The valve seat 17 has an aperture 20 extending therethrough and allows a portion of the liquid from the nipple to enter the valve body passage 12. The valve seat 17 has a shoulder 42 which rests on the shoulder 22 of the valve body 11, and is positioned within the valve body passage 12 thereby. When the nipple 15 is fully threaded in the threads of the valve body 11 the bottom of the nipple 15 engages the top 43 of the valve seat and assures that the valve seat shoulder 42 firmly engages the valve body shoulder 22. The valve seat 17 is normally constructed of stainless steel because of its desirable physical properties.

Slidably disposed within the lower portion of the valve body passage 12 is a valve spindle, designated generally as 18. Only, the upper portion of the valve spindle 18 is within the valve body passage 12, the lower portion thereof extending beyond the bottom 39 of the valve body. The valve spindle 18 is in the form of a tubular member having lopes or inlet apertures 31 drilled in the upper wall portion thereof. The lower end of the valve spindle 18 is constricted and terminates in an aperture 32 (FIG. 5). The upper most portion of the tubular member 18 is also constricted, the constriction forming a clamping means 34 for securing and positioning the valve spool bumper 19 with respect to the valve spindle 18. The bumper 19 is made of resilient material, such as rubber, and is adapted to abut against the valve seat 17 as will be explained in more detail hereinafter. The lower portion of the valve spindle 18 has a ridge or shoulder 33 which projects outwardly about the circumference thereof for purposes hereinafter to be described.

The valve spindle 18 is of a diameter so that it is easily slidable within the valve body passage 12, and sufficient clearance is allowed to provide for liquid within the valve body passage 12 to enter the several inlets 31 in the wall of the valve spindle 18.

The clevis 13, best shown in FIG. 6, of the valve body 11 has apertures 38 extending transversely therethrough. The clevis 13 is constructed to provide within its arms a lever designated generally as 26. The lever 26 has an aperture 28 that extends transversely therethrough, and is designed to be aligned with the apertures 38 in the clevis 13. A cotter pin 29 extends through the apertures 38 of the clevis 13 and the aperture 28 of the lever 26 and thereby pivotally mounts the lever 26 on the clevis 13.

The lever 26 has a first end portion 44. The first end portion 44 has an outlet aperture 30, a portion of which is designed to correspond with the lower constricted portion of the valve spindle 18, and another portion which corresponds to the valve spindle outlet 32. Thus, the lower portion of the valve spindle 18 is supported in the aperture 30 of the first end portion 44 of the lever.

The lever 26 has a second end portion 45. The second end portion 45 continues from the cotter pin or pivot point 29 a distance at least three or four times that of the distance the end portion 44 extends from the pivot point 29. The second end portion 45 is provided with threads 27. A nut 35 has threads 36 corresponding to the threads 27 of the end portion 45, and is threaded thereupon. The threads 27 extend along a substantial portion of the length of the second end portion 45, and thereby provide a means for positioning the nut 35 at multiple points along the end portion 45. The nut 35 has a groove 37 which is adapted to provide a means for securing a trough, such as a water trough for watering poultry.

Positioned about the valve spindle 18 is a spring 25. The spring 25 abuts the bottom 39 of the valve body 11, and the ridge or shoulder 33 of the valve spindle 18. The spring in this position tends to urge the valve spindle 18 and its bumper 19 out of the valve body passage 12, and out of engagement with the seat 17.

*Assembly*

The valves are assembled in the following manner. The valve body 11 is selected, and a valve seat 17 is placed on the shoulder 22 within the valve body aperture 12. A nipple 15 is then threaded into the threads of the valve body aperture 12, and tightened until the end of the valve nipple rests against the valve seat 17 and secures in position against the shoulder 22.

The O-ring seal 23 is then placed in the groove 24 of the valve body. A spring 25 is placed about the valve spindle 18, and the upper end of the valve spindle 18 and its bumper 19 are inserted into the bottom of the valve body aperture 12.

The lever 26 is positioned so that its end portion 44 corresponds with the constricted lower end of the valve spindle 18, and the lever aperture 28 positioned within the clevis 13 so as to be aligned with the clevis apertures 38. A cotter pin 29 is then inserted through the apertures 38 of the clevis and the aperture 28 of the lever securing the lever 26 in position with respect to the clevis 13.

The valve assembly 10 is now complete and ready for installation. The manner of installation is explained hereinafter in the description of the operation.

*Operation*

Having described the structure of the invention the operation thereof will now be explained.

The valve assembly 10 has been designed for use with water trough or troughs containing other liquids, and particularly for poultry water troughs. The valve assembly 10 is normally clamped to the frame (not shown) that supports a water trough. The valve assembly 10 is positioned with respect to the frame and trough so that the one end of the trough is supported in the groove 37 of the nut 35. Therefore, the lever 26 and nut 35 take the place of one end of the support frame in supporting the trough.

The threads on the upper end of the nipple are adapted to receive a connection from the main supply line, and such a connection is made to provide a source of water to the valve and trough.

With a source of water supplied to the nipple, and the trough attached to the nut 37 the valve starts to operate.

The lever arm 26 is pivoted on the cotter pin 29. Since the end portion 45 of the lever 26 is considerably longer than the end portion 44, and the weight of the trough is positioned at the proximate end of the end portion 45 the end portion 44 will tend to move upward, and the end portion 45 will tend to move downward. Since the valve spindle 18 is seated on and supported by the first end portion 44 the valve spindle 18 will tend to move upwardly or toward the valve seat 17. However, upward movement of the valve spindle 18 is opposed by the force produced by the spring 25 acting against the shoulder 33 of the valve spindle 18.

Therefore, it can be seen that we have a force caused by the weight of the trough on the lever tending to urge the valve spindle 18 into engagement with the valve seat 17, and an opposing force by the spring 18 tending to urge the valve spindle 18 out of engagement with the valve seat 17. If the force produced by the spring 18 is slightly greater than the force produced by the weight on the lever 26 the valve spindle 18 and its bumper 19 will be removed slightly from the valve seat 17, and water from the main supply line will be allowed to escape from the valve seat aperture 20 into the valve body passage 12. The water then finds its way through the valve spindle inlets 31 and is conducted through the valve spindle 18 and discharged through the valve spindle outlet 32 and through the aperture 30 of the end portion 44. The valve assembly 10 is so positioned with respect to the trough that water discharged from the aperture 30 of the end portion 44 falls into the trough and begins to fill the same. The water continues to flow and fill the trough so long as the force applied by the spring 18 is greater than the force due to the weight of the trough and water on the lever 26. However, as the trough continues to fill the weight or force applied to the lever arm 26 will increase and eventually overcome the force of the spring and raise the valve spindle 18 and its bumper 19 into engagement with the valve seat 17 producing a seal at this point and preventing further water from entering the valve body passage 12.

The path taken by the water as it flows from the valve body aperture 12, into the aperture 31, through the valve spindle, and out the aperture 32 into the trough takes a circuitous route. This provides an advantage over the water being discharged directly into the trough since it avoids splashing that would otherwise occur. It is desirable to avoid splashing since it excites the stock and makes their habitat messy.

It should now be apparent that when the poultry, or other stock, drink of the water in the trough and diminishes the amount thereof to the point where the weight thereof on the lever 26 can no longer overcome the force of the spring 25, the valve spindle 18 will again move downward, and the water will flow until the force of the spring 18 can be overcome. Thus, it can be seen that a desired level of water is automatically maintained in the water trough.

In order to maintain a desired balance between the weight applied to the lever, and the opposing force supplied by the spring 18, the nut 35 is adjustable along the second lever end portion 45. A force applied to the lever end portion such as 45, and the resultant force on the end portion 44 is directly proportional to the distances between the applied force and resultant force, and the fulcrum or pivot point. Therefore, if the weight of the trough is applied at different points along the length of the end portion 45, the resultant force of the end portion 44 applied to the valve spindle 18 will vary accordingly. Thus, by adjusting the nut 35 along the length of the end portion 45 the proper balance between the force of the trough and water therein and the force exerted by the spring 25 can be obtained. By adjusting the nut 35 the desired level of fluid within the trough can also be obtained. Also, such an adjustment allows the valve assembly 10 to be used with multiple lengths and sizes of troughs.

Another feature of this invention is that the valve assembly shuts off automatically should the water trough be deliberately or inadvertently removed from the groove 37 of the nut 35. In the normal operation of the valve the valve spindle inlets 31 assume a position above the O-ring seal 24. This position of the O-ring seal 24 prevents the water within the valve body passage 12 from escaping therefrom and draining down into the trough. However, should the weight of the water trough and the water therein be removed from the end portion 45, the force of the spring 25 will be much greater than the weight of the lever itself and quickly cause the valve spindle 18 to move downwardly or away from the valve seat 17. The valve spindle inlets 31 are then positioned even with or slightly below the O-ring seal, and liquid from the valve body passage 12 is prevented from entering the inlets 31 by the O-ring seal 24. The surface 46 of the clevis 13 acts as a stop member, and prevents the lever 26 from moving to a position where the valve spindle 18 can be forced from the valve body passage 12 by the spring 25. When the trough is again placed on the nut 35 the valve spindle 18 is moved upwardly and the valve operates as previously described.

Should the bumper 19 of the O-ring seal 24 become worn and need replacement, it is a simple matter to replace these parts without removing the valve assembly 10 from the trough supporting frame. To replace these parts it is necessary to remove only the trough from the groove 37 and the cotter pin 29 from the clevis and lever apertures. The lever 26 is then readily removable and the valve spindle 18 will slide from the valve body passage 12 providing easy access to the O-ring seal 24 or the valve spindle bumper 19. It is also an easy matter to replace the spring 25 at this time should the spring have become fatigued. The valve assembly 10 is then reassembled in the same manner as it was disassembled.

It can be seen that a valve assembly 10 has been disclosed which will maintain a constant liquid level in a water trough, or in any other equipment where it is desirable to maintain liquid at a constant level. The valve assembly consists of a minimum number of parts, and a minimum number of movable parts, and therefore is economical to manufacture, and rugged in construction producing long periods of trouble free service. The adjustable feature of the lever provides a means whereby the valve may be used with various sizes and designs of equipment. This valve assembly provides an added feature in that should the equipment become disconnected from the valve assembly the valve will automatically shut off and prevent flooding and waste of the liquid.

While a preferred embodiment of this invention has been described, it will be understood that other modifications and improvements may be made thereto. Such of these modifications and improvements as incorporate the principles of this invention are to be considered as included in the hereinafter appended claims unless these claims by their language expressly state otherwise.

I claim:

1. A valve mechanism comprising; a valve body means having a passage therethrough, a valve seat within said valve means passage; a valve spindle means slidable in said passage, said valve spindle means having a conduit therethrough including an inlet and outlet and being constructed to regulate flow through said conduit and to engage said valve seat; resilient means urging said valve to unseat; lever means adapted to support a trough and urge the valve spindle into engagement with the valve seat whereby the weight of the trough and the contents thereof regulate the flow of liquid through the valve body and the valve spindle, and safety means automatically operable by said resilient means for terminating flow through said conduit by said inlet thereof should the weight of said trough be removed from said lever means.

2. A valve mechanism comprising; a valve body means having a passage therethrough, a valve seat within said valve means passage; a valve spindle means slidable in said passage, said valve spindle means having a conduit therethrough including an inlet, said valve spindle means being constructively arranged to engage said valve seat and to regulate flow through said conduit; said valve spindle at one end terminating in an outlet; resilient means urging said valve spindle out of engagement with said valve seat; lever means pivotally mounted on said valve body means, said lever means having an aperture in a first end portion thereof corresponding substantially to said valve spindle outlet and directly supporting said valve spindle, said lever means having a second end portion and means on said second end portion for changing the effective length thereof whereby a force urging said valve spindle into engagement with said valve seat by attaching a trough on said means on said second end portion may be varied by changing the effective length of said second end portion.

3. A valve mechanism comprising; a valve body means having a passage therethrough, a valve seat within said valve means passage; a valve spindle means having a wall with an upper and lower portion and being slidable in said passage, said valve spindle means having a conduit therethrough the inlet to said valve conduit being formed by holes in the upper portion of the wall of said valve spindle, said valve spindle having a ridge formed about the lower portion thereof, said valve spindle further having a resilient bumper positioned to engage said valve seat; said valve body means having a bottom and a groove formed in the lower portion of the passage thereof, seal means disposed within said groove and abutting said valve spindle; resilient means disposed about said valve spool and abutting said valve spool ridge and said valve body bottom and urging said valve spool and bumper out of engagement with said valve seat; and lever means adapted to urge said valve spool into engagement with said valve seat, said seal means being so positioned with respect to said valve spool inlets as to automatically prevent liquid from entering said inlet when the resilient means urges the valve spool out of engagement with the valve seat and there is no or little opposition offered by said lever means.

4. A valve mechanism comprising; a valve body means having a passage therethrough, a valve seat within said valve means passage; a valve spindle means slidable in said passage, said valve spindle means having a conduit therethrough including an inlet and outlet; said valve spindle means being constructed to regulate flow through said conduit and arranged to engage said valve seat; resilient means urging said valve spindle out of engagement with said valve seat; lever means pivotally mounted on said valve body means, said lever means having an opening in a first end portion thereof substantially in alignment with said valve spindle conduit and directly supporting said valve spindle, said lever means having a second end portion and means on said second end portion for changing the effective length thereof whereby a force urging said valve spindle into engagement with said valve seat by attaching a trough on said means on said second end portion may be varied by changing the effective length of said second end portion.

5. A valve mechanism comprising; a valve body means having a passageway therethrough; a tubular valve member reciprocally mounted in said conduit and having a longitudinal passageway extending therethrough, means providing communication between the said valve member and said valve body conduit, a valve closure means on one end of said valve member adjacent said valve seat and adapted to seat thereon to stop the flow of fluid through said valve body conduit; exit means at the other end of said valve member permitting flow of fluid from said longitudinal conduit, seal means positioned in said valve body passageway and engaging said valve member to form a liquid seal therebetween, bias means for urging said valve member and closure means to withdraw from said valve seat, and means including a lever and trough attached thereto for partially overcoming said bias means, said bias means automatically moving said communication means into engagement with said seal means to terminate the flow of liquid through said conduit should said trough become removed from said lever.

References Cited in the file of this patent

UNITED STATES PATENTS

| | | |
|---|---|---|
| 2,629,397 | Toadvine | Feb. 24, 1953 |
| 2,641,276 | Suter | June 9, 1953 |
| 2,716,423 | Landgraf | Aug. 30, 1955 |